US008515072B2

(12) United States Patent
Spahic (10) Patent No.: US 8,515,072 B2
(45) Date of Patent: Aug. 20, 2013

(54) METHOD AND APPARATUS FOR PROVIDING SECURE COMMUNICATIONS FOR MOBILE COMMUNICATION DEVICES

(75) Inventor: Victor Spahic, Haymarket, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 364 days.

(21) Appl. No.: 12/844,569

(22) Filed: Jul. 27, 2010

(65) Prior Publication Data
US 2011/0222689 A1 Sep. 15, 2011

Related U.S. Application Data (60) Provisional application No. 61/312,385, filed on Mar. 10, 2010.

(51) Int. Cl.
*H04L 9/00* (2006.01)

(52) U.S. Cl.
USPC ........... 380/270; 380/271; 380/272; 380/277; 380/278; 713/170; 713/171; 713/172; 713/173

(58) Field of Classification Search
USPC ................. 380/200, 271, 270; 713/150, 155, 713/172
See application file for complete search history.

(56) References Cited

U.S. PATENT DOCUMENTS

| 7,089,417 | B2 | 8/2006 | Wack et al. |
| 7,243,228 | B2 | 7/2007 | Shirai et al. |
| 7,295,831 | B2 | 11/2007 | Coleman et al. |
| 7,328,012 | B2 | 2/2008 | Ziarno et al. |
| 2003/0108199 | A1* | 6/2003 | Pinder et al. ................. 380/200 |
| 2003/0217289 | A1 | 11/2003 | Ammon et al. |
| 2005/0210234 | A1 | 9/2005 | Best et al. |
| 2007/0177578 | A1 | 8/2007 | Anspach et al. |
| 2007/0192613 | A1 | 8/2007 | Amoroso et al. |
| 2008/0120707 | A1 | 5/2008 | Ramia |
| 2009/0119503 | A1 | 5/2009 | Isaakian et al. |
| 2009/0287799 | A1 | 11/2009 | Tameshige et al. |
| 2010/0005179 | A1 | 1/2010 | Dickson et al. |
| 2010/0195833 | A1* | 8/2010 | Priestley et al. ............. 380/273 |

OTHER PUBLICATIONS

"CryptDB: Protecting Confidentiality with Encrypted Query Processing" MIT Sep. 2006 http://nms.lcs.mit.edu/papers/cryptdb-sosp11.pdf.*
http://support.sas.com/documentation/cdl/en/secref/62092/PDF/default/secref.pdf "Encryption in SAS 9.2"—SAS Aug. 2009.*

* cited by examiner

*Primary Examiner* — Krista Zele
*Assistant Examiner* — Randy Scott
(74) *Attorney, Agent, or Firm* — Ronald E. Prass, Jr.; Prass LLP (57) ABSTRACT

A method and apparatus that enables secure communications from a wireless communication device is disclosed. The method may include receiving a signal to transmit data, wherein the data is at least one of voice, text, image, and video, applying a first layer of encryption to the data, applying a second layer of encryption to the data, applying a third layer of encryption to the data, and sending the encrypted data over a communications network.

21 Claims, 5 Drawing Sheets

METHOD AND APPARATUS FOR PROVIDING SECURE COMMUNICATIONS FOR MOBILE COMMUNICATION DEVICES

PRIORITY INFORMATION

This application claims priority from U.S. Provisional Patent Application Ser. No. 61/312,385, filed Mar. 10, 2010, the content of which is incorporated herein by reference in its entirety.

BACKGROUND

1. Field of the Disclosed Embodiments

The disclosure relates to providing secure communications for mobile communication devices.

2. Introduction

As the use and necessity of wireless communications grows, the development of secure communications has become a priority to enable military, Government and civilian personnel to properly use their mobile devices without fear of compromising secure information. Conventional commercial wireless solutions commonly use only one layer of encryption which does not provide adequate protection for sensitive Government information, military and in certain cases, proprietary information.

SUMMARY OF THE DISCLOSED EMBODIMENTS

A method and apparatus that enables secure communications from a wireless communication device is disclosed. The method may include receiving a signal to transmit data, wherein the data is at least one of voice, text, image, and video, applying a first layer of encryption to the data, applying a second layer of encryption to the data, applying a third layer of encryption to the data, and sending the encrypted data over a communications network.

BRIEF DESCRIPTION OF THE DRAWINGS

In order to describe the manner in which the above-recited and other advantages and features of the disclosed embodiments can be obtained, a more particular description of the disclosed embodiments briefly described above will be rendered by reference to specific embodiments thereof which are illustrated in the appended drawings. Understanding that these drawings depict only typical disclosed embodiments and are not therefore to be considered to be limiting of its scope, the disclosed embodiments will be described and explained with additional specificity and detail through the use of the accompanying drawings in which.

DETAILED DESCRIPTION OF THE DISCLOSED EMBODIMENTS

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed embodiments may concern a method and apparatus that may provide an integrated secure wireless solution to enable users to conduct their mission/business using secure wireless. The disclosed embodiments may enable and facilitate improved collaboration and productivity through increased mobility. Furthermore, users will benefit from a reduction in operating and maintenance (O&M) costs. The disclosed embodiments may enable these improvements in productivity by allowing the user to securely access their data as well as custom and commercial, off-the-shelf (COTS) applications in a Sensitive Compartmented Information Facility (SCIF) or other proprietary or security-sensitive area.

The disclosed embodiments may also provide significant benefits to rapid deployments for tactical environments overseas by reducing the amount of equipment shipped, significantly improving the time to bring a secure network up while providing mobility to the overseas personnel, such as military, government or civilian personnel. Applications may be integrated and utilized in a secure manner.

Reductions in O&M costs may be attributable to the reduction in wired infrastructure, replacement of regular or Voice Over Internet Protocol (VOIP) phones and the ability to do full motion video, voice and data securely in both classified environments and corporate environments while reducing the costs to outfit new work areas or new buildings.

Cyber security may be integrated in the disclosed embodiments and through triple encryption while preventing data compromise by not allowing any data to be stored on the end-points. This layered commercial encryption may provide secure wireless access to a multitude of customers from government and military users (up to the top secret information level) as well as commercial enterprises, such as banking or healthcare (for electronic patient records, etc. for example).

In this manner, the three layers of encryption may exist within the infrastructure of the disclosed embodiments to protect sensitive data and adhere to the highest government standards.

Figure 1A:
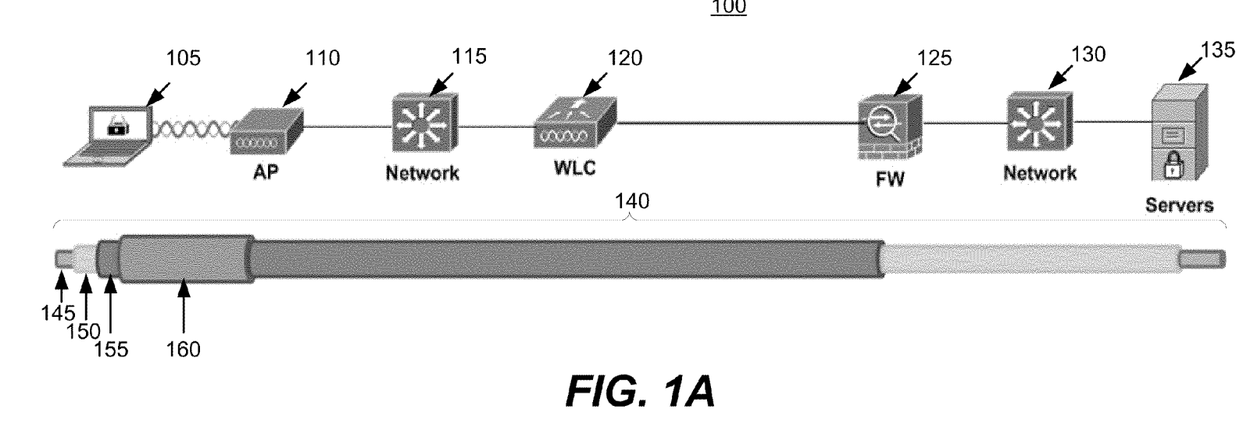
FIGS. 1A and 1B are exemplary diagrams of a wireless communication network environment in accordance with a possible embodiment of the disclosure.
Figure 1B:
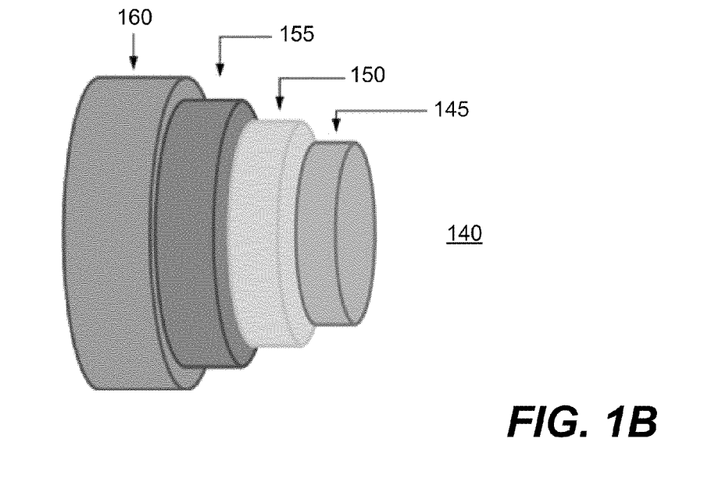

FIGS. 1A and 1B are exemplary diagrams of a wireless communication network environment 100 in accordance with a possible embodiment of the disclosure. In particular, the communication network environment 100 may include one or more exemplary communication devices such as wireless processing devices 105 which may communicate through a first communication network 115 through one or more access points 110. A wireless local area network controller 120 receives the communication (or data) and it reaches the server 135 through the firewall 125 and a second communication network 130.

Communications networks 115, 130 may represent any communications network used to communicate with other entities, including the Internet, an intranet, a radio network, a wireless network, hardwired network, satellite network, etc. The exemplary wireless processing device 105 may be any device capable of sending and receiving messages and/or attachments, such as a processing device, a mobile communication device, a portable computer, a desktop computer, a server, a network router, a gateway device, or combinations of the above, for example.

FIG. 1A shows an exemplary end-to-end view of this infrastructure and the varying layers of encryption present at each level with respect to Wireless-Fidelity (Wi-Fi) communications. Note that while FIG. 1A shows a laptop computer, any other wireless device that uses Wi-Fi may be used, such as personal digital assistants (PDAs) or other wireless communications device. Note also, that while various components are illustrated between the exemplary wireless processing device 105 and the server 135, these components and their arrangement may vary as known to one of skill in the art.

Initially, end-user mobile devices may be provisioned with 802.1x certificates by information technology (IT) personnel at an offsite location, for example. These certificates may enable the mobile devices to connect to the secure wireless access points 110 which may be deployed at the user's site. All data or communications 145 between the end-user exemplary wireless processing device 105 and the wireless access points 110 are encrypted as a first encryption layer 150 following a Wi-Fi Protected Access (WPA2) standard, such as a session or presentation layer encryption (e.g., Advanced Encryption Standard (AES) AES-128 encryption), for example. Note that FIG. 1B illustrates a close-up view of the three layers of encryption 140 shown in FIG. 1A.

The second layer of encryption 155 may be achieved through network layer encryption by connecting to a secure Virtual Private Network (VPN) server with a user login, utilizing a robust encryption method, such as the 1024-bit, 2048-bit or any other future standard key AES-256, for example. The user login may include any combination of biometrics, hardware tokens and secure passwords, for example. To provide added security, the 1024-bit, 2048-bit or any other future standard keys required by AES-256 to communicate through the VPN may be rotated periodically, such as every two minutes, for example.

Once a user is authenticated through the VPN, they will then need to provide an additional set of credentials to login to the Virtual Desktop Infrastructure (VDI) client. This third layer of encryption 160 may provide the user access to their normal work environment and may utilize the user's existing hardware and infrastructure. This third layer of encryption 160 may be transmitted through the Secure Sockets Layer (SSL) using data layer encryption (e.g., 128-bit, Rivest Cipher 5 (RC5) encryption), for example. Since the communication device 105 may be a virtual desktop, all data may remain stored on the user's secure back-end so that only presentation layer information may be sent through the three layers of encryption, for example.

Figure 2A:
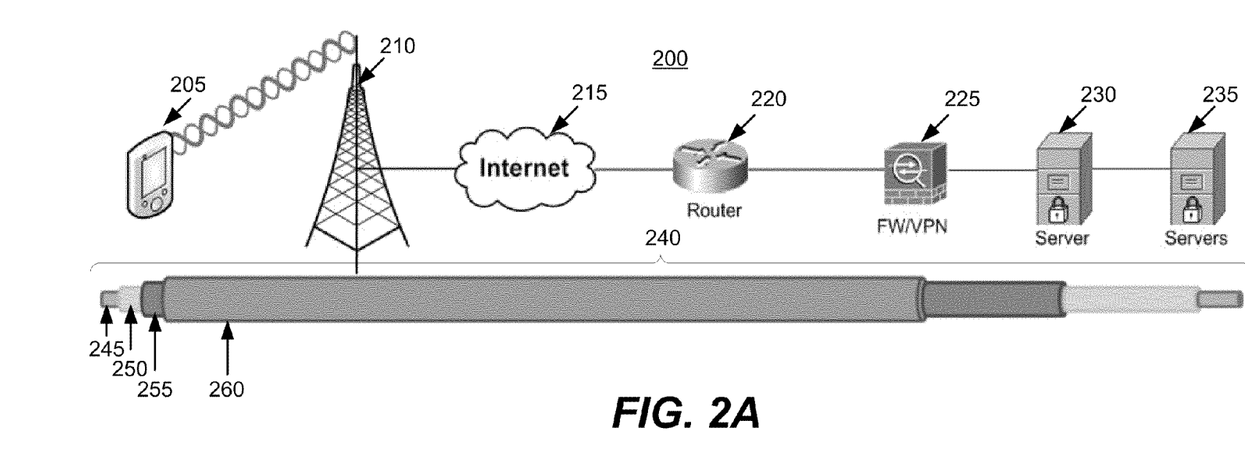
FIGS. 2A and 2B are exemplary diagrams of another wireless communication network environment in accordance with a possible embodiment of the disclosure.
Figure 2B:
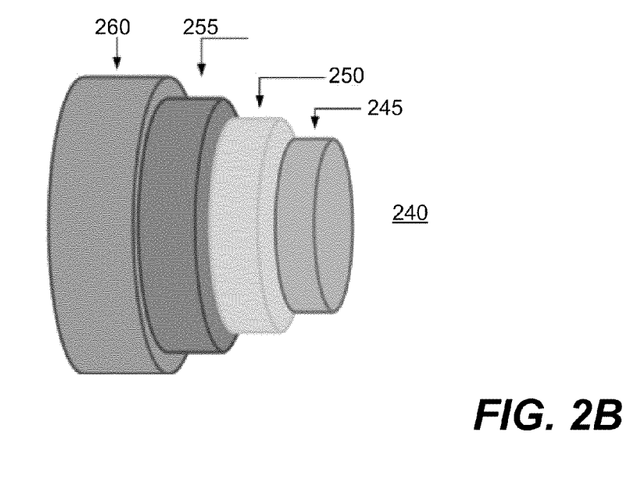

FIGS. 2A and 2B are exemplary diagrams of another wireless communication network environment 200 in accordance with a possible embodiment of the disclosure. Users may also benefit from the added productivity of accessing their data through specialized applications on communication devices 205, such as PDAs, smartphones, etc. while out of range of secure wireless access points. This access may be accomplished using a connection to a secure network from the Internet 215 via 3G (third-generation), 4G (fourth-generation), or any other future standard of communications, for example.

Three layers of encryption 240 may be maintained through this mode of access with a solution utilizing the disclosed embodiments. Due to the realities of unreliable network connections and limited bandwidth in the field, it may be desirable for mobile communication device 205 users to have offline access to some information. In addition to credentials required to unlock those devices 205, data-at-rest on the mobile communication device 205 and applications which access information on the secure network may be sandboxed and encrypted by software installed on the mobile communication device 205 before it is deployed. In this instance, the first encryption layer 250 for data 245 to be communicated may be a session or presentation layer encryption (e.g., AES-192 encryption), for example.

Secondly, a secure VPN connection 225 may be made between the mobile communication device 205 and the network using available 3G), 4G, or any other future standard of communications access, for example. This connection may use a second layer of encryption 255, such as a session or presentation layer encryption (e.g., AES-192 encryption), for example. Finally, applications providing e-mail, calendar, collaboration, virtual desktop or specialized applications which support mission needs may present an additional third layer of authentication and encryption, such as a network layer encryption (e.g., 1024-bit, 2048-bit or any other future standard key AES-256 encryption).

Figure 3:
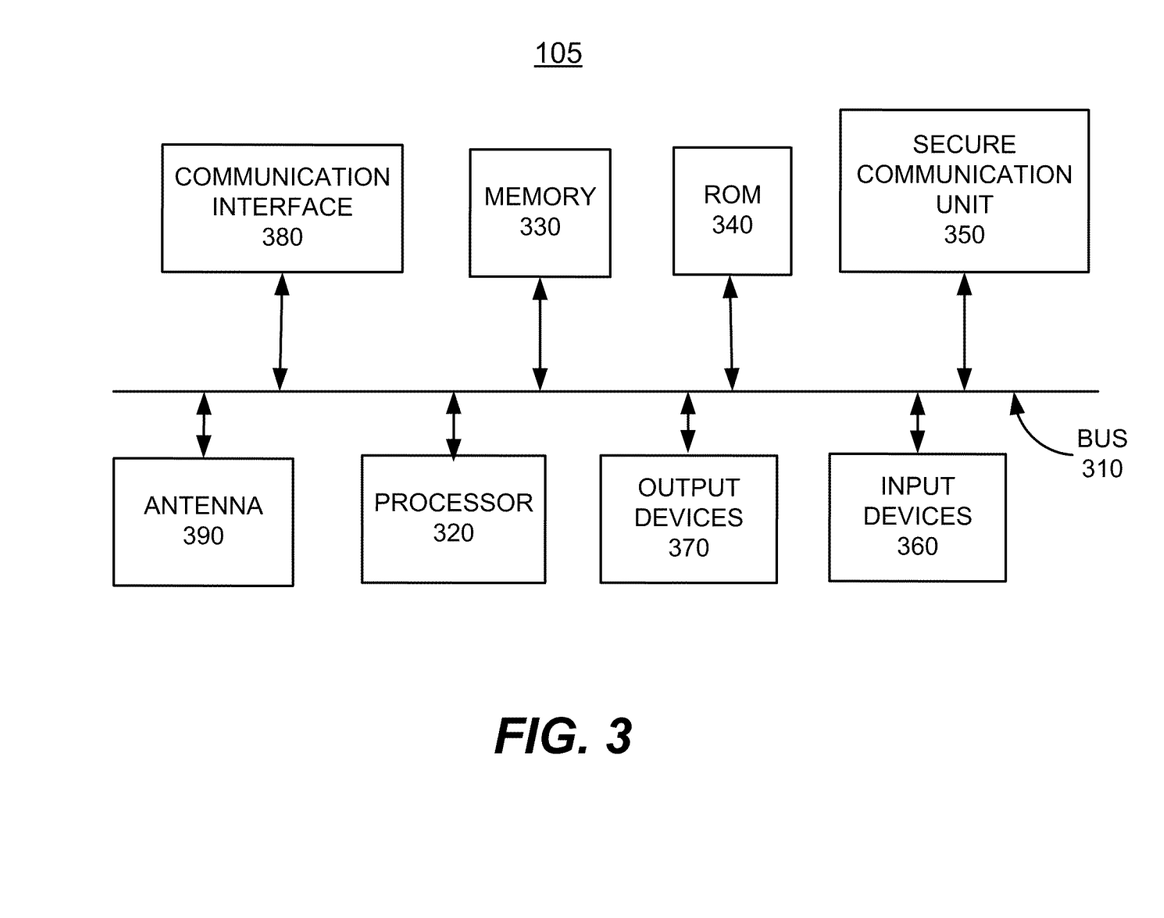
FIG. 3 is a block diagram of an exemplary wireless processing device in accordance with a possible embodiment of the disclosure.

FIG. 3 is a block diagram of an exemplary wireless processing device 105 in accordance with a possible embodiment of the disclosure. The exemplary wireless processing device 105 may include a bus 310, a processor 320, a memory 330, a read only memory (ROM) 340, a secure communication unit 350, input devices 360, output devices 370, a communication interface 380, and antenna 390. Bus 310 may permit communication among the components of the display data management unit 120.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any type of storage media or media drive, such as, for example, magnetic or optical recording media and its corresponding drive.

Input devices 360 may include one or more conventional mechanisms that may permit a user to input information to the display data management unit 120, such as a keyboard, a mouse, a pen, a voice recognition device, etc. Output devices 370 may include one or more conventional mechanisms that output information to the user, including a display, a printer, one or more speakers, or a medium, such as a memory, or a magnetic, wireless protocols used for exchanging data over short distances from fixed or mobile devices, or optical disk and a corresponding disk drive.

Communication interface 380 may include any transceiver-like mechanism that enables the display content management unit 350 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. Antenna 390 may be any antenna or antenna configuration known to one of skill in the art to facilitate wireless communications from the exemplary wireless processing device 105.

The exemplary wireless processing device 105 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

The exemplary wireless processing device 105 illustrated in FIGS. 1 and 3 and the related discussion are intended to provide a brief, general description of a suitable computing environment in which the disclosure may be implemented. Although not required, the disclosure will be described, at least in part, in the general context of computer-executable instructions, such as program modules, being executed by the exemplary wireless processing device 105, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 4:
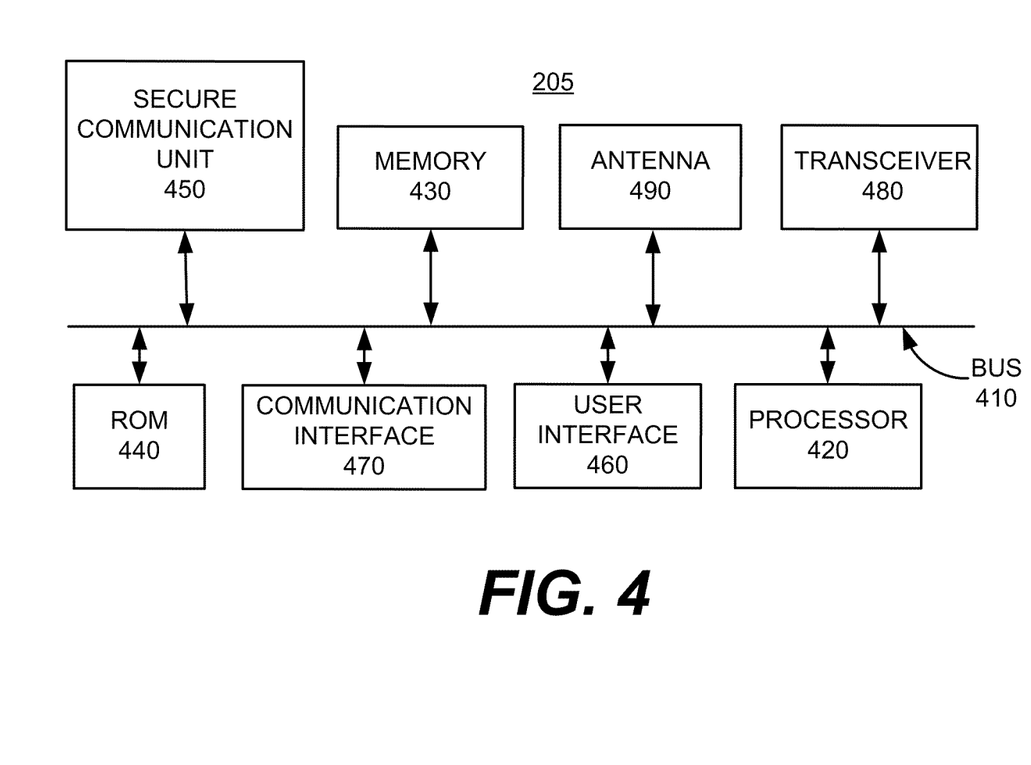
FIG. 4 is a block diagram of an exemplary wireless communication device in accordance with a possible embodiment of the disclosure.

FIG. 4 is a block diagram of an exemplary wireless communication device 205 in accordance with a possible embodiment of the disclosure. The exemplary wireless communication device 205 may include a bus 410, a processor 420, a memory 430, a read only memory (ROM) 440, a secure communication unit 450, a user interface 460, and a communication interface 470, a transceiver 480, and an antenna 490. Bus 410 may permit communication among the components of the wireless communication device 205.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may include an internal or external storage device that may include any type of media, such as, for example, magnetic or optical recording media and its corresponding drive.

User interface 460 may include one or more conventional input mechanisms that permit a user to input information, communicate with the wireless communication device 205 and/or present information to the user, such as a an electronic display, microphone, touchpad, keypad, keyboard, mouse, pen, stylus, voice recognition device, buttons, one or more speakers, etc. User interface 460 may also include one or more conventional mechanisms that output information to the user, including a display, a printer, one or more speakers, wireless protocols used for exchanging data over short distances from fixed or mobile devices, or a medium, such as a memory, or a magnetic or optical disk and a corresponding disk drive.

Communication interface 470 may include any transceiver-like mechanism that enables the wireless communication device 205 to communicate via a network. For example, communication interface 470 may include a modem, or an Ethernet interface for communicating via a local area network (LAN). Alternatively, communication interface 470 may include other mechanisms for communicating with other devices and/or systems via wired, wireless or optical connections. In some implementations of the wireless communication device 205, communication interface 470 may not be included in the exemplary wireless communication device 205 when the communication process is implemented completely within the wireless communication device 205.

Transceiver 480 may be any communication device that may send and receive communications and/or data from the wireless communication device 205 known to one of skill in the art. Antenna 490 may be any antenna or antenna configuration known to one of skill in the art to facilitate wireless communications from the exemplary wireless communication device 205.

The wireless communication device 205 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 470.

The communication network environment 200 and the wireless communication device 205 illustrated in FIGS. 2 and 4 and the related discussion are intended to provide a brief, general description of a suitable computing environment in which the disclosed embodiments may be implemented. Although not required, the disclosed embodiments will be described, at least in part, in the general context of computer-executable instructions, such as program modules, being executed by the wireless communication device 205, such as a general purpose computer. Generally, program modules include routine programs, objects, components, data structures, etc. that perform particular tasks or implement particular abstract data types. Moreover, those skilled in the art will appreciate that other embodiments of the disclosed embodiments may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

For illustrative purposes, the operation of the secure communication units 350, 450 and the secure communication process will be described below in FIG. 5 in relation to the diagrams shown in FIGS. 1-4.

Figure 5:
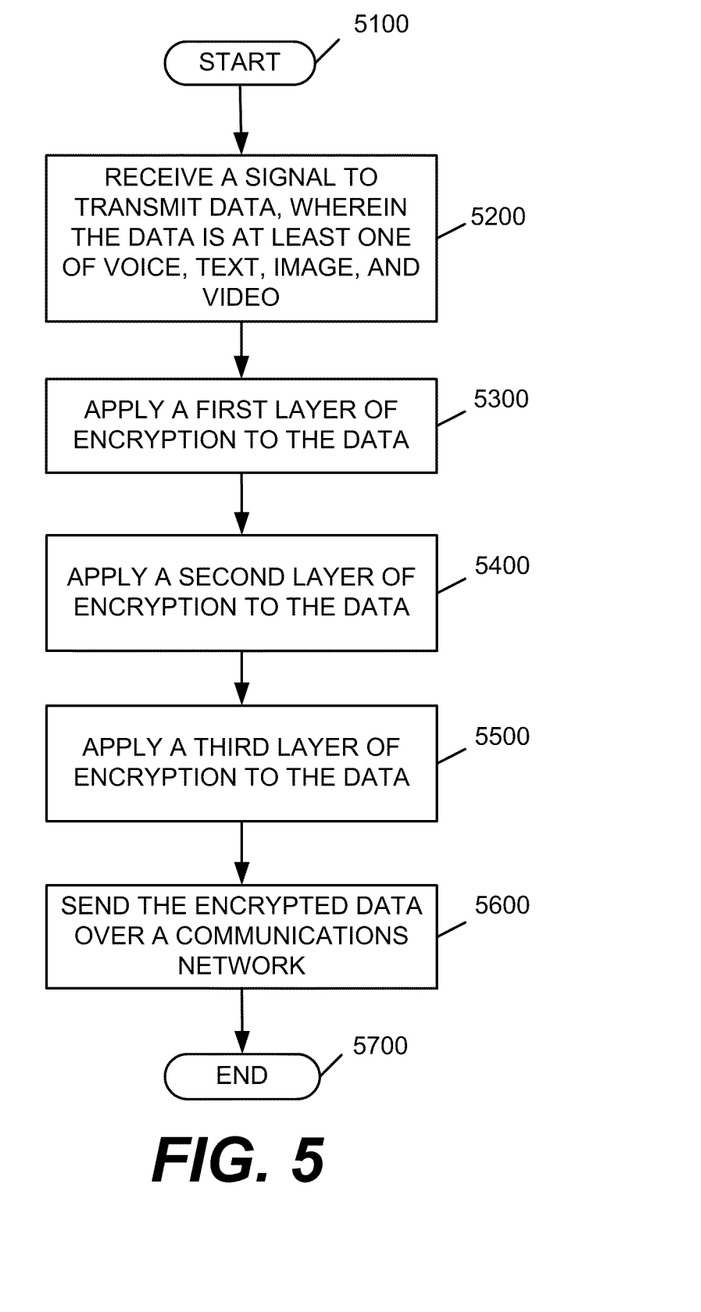
FIG. 5 is an exemplary flowchart illustrating secure communication process in accordance with one possible embodiment of the disclosure.

FIG. 5 is an exemplary flowchart illustrating secure communication process in accordance with one possible embodiment of the disclosure. Note that this flowchart presents a generic embodiment for the two of the possible embodiments shown in FIGS. 1 and 2. The process may begin at step 5100 and continue to step 5200 where the secure communication unit 350, 450 may receive a signal to transmit data. The data may be voice, text, image, video, or a combination thereof. Data may be defined as anything in a form suitable for use with a computer. Data may be often distinguished from programs. A program may be a set of instructions that detail a task for the computer to perform. In this sense, data may thus be everything that is not program code, for example. Text may be both human readable and non-human readable (for example binary files) and may also be part of the definition of data.

At step 5300, the secure communication unit 350, 450 may apply a first layer of encryption to the data. The first layer of encryption 150, 250 may be session layer encryption or presentation layer encryption, for example.

At step 5400, the secure communication unit 350, 450 may apply a second layer of encryption 155, 255 to the data. The second layer of encryption 155, 255 may be either session layer encryption, presentation layer encryption, or network layer encryption, for example. The second layer of encryption 255 may be either session layer encryption or presentation layer encryption for communications from a wireless communication device 105, such as a wireless telephone or personal digital assistant (PDA). The second layer of encryption 155 may be network layer encryption for communications from a wireless processing device 105, such as from a wireless laptop computer, for example.

At step 5500, the secure communication unit 350, 450 may apply a third layer of encryption 160, 260 to the data. At step 5600, the secure communication unit 350, 450 may send the encrypted data over a communications network using the communication interface. The third layer of encryption 160, 260 may be either data layer encryption or network layer encryption, for example. The third layer of encryption 260 may be network layer encryption for communications from a wireless communication device 105, such as a wireless telephone or personal digital assistant (PDA), for example. The third layer of encryption 260 may be data layer encryption for communications from a wireless processing device 105, such as from a wireless laptop computer, for example. The process may then go to step 5700, and end.

the wireless communication device is one of a server, a computer, a laptop computer, a processing device, a wireless telephone, a Personal Digital Assistant (PDA), a cellular telephone, an MP3 player, a camera, and a device that combines one or more of a server, a computer, a processing device, a wireless telephone, a Personal Digital Assistant (PDA), a cellular telephone, an MP3 player, and a camera.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

I claim:

1. A method to enable secure communications between a user's wireless communication device and a secure data server, comprising:

establishing, with a processor, a first communication link between the user's wireless communication device and a wireless communication node, the first communication link requiring user input of first identification information via the user's wireless communication device;

establishing, with the processor, a second communication link between the wireless communication node and a communication gateway, the second communication link requiring user input of second identification information via the user's wireless communication device, the second identification information being different identification information from the first identification information;

establishing, with the processor, a third communication link between the communication gateway and the secure data server;

exchanging data with the processor between the user's wireless communication device and the secure data server via the first, second and third communication links, the data being at least one of voice, text, image, and video data, wherein:

a first layer of encryption is applied to the data exchanged between the user's wireless communication device and the secure data server via the first, second and third communication links, a second layer of encryption is applied to the data exchanged between the user's wireless communication device and the communication gateway via the first and second communication links, a third layer of encryption is applied to the data exchanged between the user's wireless communication device and the wireless communication node via the first communication link.

2. The method of claim 1, wherein the first layer of encryption is one of session layer encryption and presentation layer encryption.

3. The method of claim 1, wherein the second layer of encryption is one of session layer encryption, presentation layer encryption, and network layer encryption.

4. The method of claim 3, wherein the second layer of encryption is one of session layer encryption and presentation layer encryption for communications when the user's wireless communication device is one of a wireless telephone and a personal digital assistant (PDA), and network layer encryption for the communications when the user's wireless communication device is a wireless laptop computer.

5. The method of claim 1, wherein the third layer of encryption is one of data layer encryption and network layer encryption.

6. The method of claim 5, wherein the third layer of encryption is network layer encryption for communications when the user's wireless communication device is one of a wireless telephone and a personal digital assistant (PDA), and data layer encryption for the communications when the user's wireless communication device is a wireless laptop computer.

7. The method of claim 1, wherein the user's wireless communication device is at least one of a laptop computer, a wireless telephone, a Personal Digital Assistant (PDA), a cellular telephone, an MP3 player, and a camera.

8. A wireless communication device that enables secure communications with a secure data server, comprising:

an input interface by which a user inputs information to the wireless communication device;

a communication interface that facilitates exchanging data with the secure data server; and a secure communication unit that receives an input to transmit secure data, the secure communication unit (1) establishing a first communication link between the wireless communication device and a wireless communication node after entry of first identification information by a user via input interface, (2) establishing a second communication link between the wireless communication node and a communication gateway after entry of second identification information by the user via the input interface, (3) establishing a third communication link between the communication gateway and the secure data server, and (4) exchanging data with the secure data server via the communication interface and the first, second and third communication links, wherein:

the data is at least one of voice, text, image, and video data, a first layer of encryption is applied to the data exchanged between the wireless communication device and the secure data server via the first, second and third communication links, a second layer of encryption is applied to the data exchanged between the wireless communication device and the communication gateway via the first and second communication links, and a third layer of encryption is applied to the data exchanged between the wireless communication device and the wireless communication node via the first communication link.

9. The device of claim 8, wherein the first layer of encryption is one of session layer encryption and presentation layer encryption.

10. The device of claim 8, wherein the second layer of encryption is one of session layer encryption, presentation layer encryption, and network layer encryption.

11. The device of claim 10, wherein the second layer of encryption is one of session layer encryption and presentation layer encryption for communications when the device is one of a wireless telephone and a personal digital assistant (PDA), and network layer encryption for the communications when the device is a wireless laptop computer.

12. The device of claim 8, wherein the third layer of encryption is one of data layer encryption and network layer encryption.

13. The device of claim 12, wherein the third layer of encryption is network layer encryption for communications when the device is one of a wireless telephone and personal digital assistant (PDA), and data layer encryption for communications when the device is a wireless laptop computer.

14. The device of claim 8, wherein the device is at least one of a laptop computer, a wireless telephone, a Personal Digital Assistant (PDA), a cellular telephone, an MP3 player, and a camera.

15. A non-transitory computer-readable medium storing instructions which, when executed by a computing device, cause the computing device execute a method to enable secure communications between a wireless communication device and a secure data server, the method comprising:

establishing a first communication link between the wireless communication device and a wireless communication node, the first communication link requiring user input of first identification information via the wireless communication device;

establishing a second communication link between the wireless communication node and a communication gateway, the second communication link requiring user input of second identification information via the wireless communication device, the second identification information being different identification information from the first identification information;

establishing a third communication link between the communication gateway and the secure data server;

exchanging data between the wireless communication device and the secure data server via the first, second and third communication links, the data being at least one of voice, text, image, and video data, wherein:

a first layer of encryption is applied to the data exchanged between the wireless communication device and the secure data server via the first, second and third communication links, a second layer of encryption to the data exchanged between the wireless communication device and the communication gateway via the first and second communication links, a third layer of encryption is applied to the data exchanged between the wireless communication device and wireless communication node via the first communication link.

16. The non-transitory computer-readable medium of claim 15, wherein the first layer of encryption is one of session layer encryption and presentation layer encryption.

17. The non-transitory computer-readable medium of claim 15, wherein the second layer of encryption is one of session layer encryption, presentation layer encryption, and network layer encryption.

18. The non-transitory computer-readable medium of claim 17, wherein the second layer of encryption is one of session layer encryption and presentation layer encryption for communications when the wireless communication device is one of a wireless telephone and personal digital assistant (PDA), and network layer encryption for communications when the wireless communication device is a wireless laptop computer.

19. The non-transitory computer-readable medium of claim 15, wherein the third layer of encryption is one of data layer encryption and network layer encryption.

20. The non-transitory computer-readable medium of claim 19, wherein the third layer of encryption is network layer encryption for communications when the wireless communication device is one of a wireless telephone and personal digital assistant (PDA), and data layer encryption for communications when the wireless communication device is a wireless laptop computer.

21. The non-transitory computer-readable medium of claim 15, wherein the wireless communication device is at least one of a laptop computer, a wireless telephone, a Personal Digital Assistant (PDA), a cellular telephone, an MP3 player, and a camera.

\* \* \* \* \*